(12) United States Patent
Seki et al.

(10) Patent No.: US 7,370,902 B2
(45) Date of Patent: May 13, 2008

(54) COWLING STRUCTURE OF MOTORCYCLE

(75) Inventors: Yoshitaka Seki, Wako (JP); Yoshiyuki Kurayoshi, Wako (JP); Kiyoshi Katagiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 11/447,872

(22) Filed: Jun. 7, 2006

(65) Prior Publication Data

US 2006/0283647 A1    Dec. 21, 2006

(30) Foreign Application Priority Data

Jun. 15, 2005    (JP)    ............................. 2005-175546

(51) Int. Cl.
 *B62J 17/00*    (2006.01)
(52) U.S. Cl. .................... 296/78.1; 180/68.1
(58) Field of Classification Search ............. 296/78.1, 296/208; 180/68.1
See application file for complete search history.

(56) References Cited

U.S. PATENT DOCUMENTS

| | | | | |
|---|---|---|---|---|
| 1,856,772 | A * | 5/1932 | Masury et al. ............. | 180/68.4 |
| 4,618,020 | A * | 10/1986 | Noda et al. ................. | 180/68.1 |
| 4,633,965 | A * | 1/1987 | Tsurumi et al. ............ | 296/78.1 |
| 4,709,774 | A * | 12/1987 | Saito et al. ................. | 296/78.1 |
| 4,830,135 | A * | 5/1989 | Yamashita ................. | 180/68.1 |
| 4,913,256 | A * | 4/1990 | Sakuma ...................... | 180/68.1 |
| 4,964,484 | A * | 10/1990 | Buell ......................... | 296/78.1 |
| 5,330,029 | A * | 7/1994 | Yoshimura et al. ......... | 180/219 |
| 5,577,570 | A * | 11/1996 | Shiohara et al. ........... | 180/68.1 |
| 5,915,344 | A * | 6/1999 | Suzuki et al. ............. | 123/41.11 |
| 5,979,966 | A * | 11/1999 | Suzuki ....................... | 296/78.1 |
| 6,422,332 | B1 * | 7/2002 | Takata et al. ............. | 180/68.3 |
| 6,695,088 | B2 * | 2/2004 | Schroeder .................. | 180/68.3 |
| 6,827,064 | B2 * | 12/2004 | Akagi et al. ................ | 123/431 |
| 6,857,497 | B2 * | 2/2005 | Sato et al. .................. | 180/312 |
| 6,860,359 | B2 * | 3/2005 | Tanabe et al. .............. | 180/309 |
| 6,889,789 | B2 * | 5/2005 | Kurayoshi et al. .......... | 180/219 |
| 6,910,716 | B2 * | 6/2005 | Kurayoshi et al. .......... | 280/835 |
| 7,013,874 | B2 * | 3/2006 | Kurayoshi et al. .......... | 123/468 |
| 7,080,929 | B2 * | 7/2006 | Uemoto et al. ............. | 362/475 |
| 7,100,575 | B2 * | 9/2006 | Kurayoshi et al. .......... | 123/470 |
| 7,137,722 | B2 * | 11/2006 | Uemoto et al. ............. | 362/473 |
| 7,204,624 | B2 * | 4/2007 | Katagiri ..................... | 362/475 |
| 2005/0224266 | A1 * | 10/2005 | Konno et al. .............. | 180/68.1 |
| 2006/0048991 | A1 * | 3/2006 | Sunaguchi et al. ........ | 180/68.6 |
| 2006/0219450 | A1 * | 10/2006 | Misaki et al. .............. | 180/68.4 |

(Continued)

FOREIGN PATENT DOCUMENTS

EP    0 248 619 A2    12/1987

(Continued)

*Primary Examiner*—Kiran B. Patel
(74) *Attorney, Agent, or Firm*—Westerman, Hattori, Daniels & Adrian, LLP.

(57) ABSTRACT

A cowling structure of a motorcycle having a radiator behind a front wheel, including a cowling which covers a periphery of the radiator from a front side of a handlebar, wherein an opening which extends in the longitudinal direction of the motorcycle is formed in the cowling such that the opening traverses an upper portion of the radiator in a side view, thus allowing air to pass through the opening and thus through the motorcycle in the lateral direction thereof.

5 Claims, 5 Drawing Sheets

U.S. PATENT DOCUMENTS

2006/0283418 A1* 12/2006 Matsuda et al. ......... 123/197.1
2006/0283647 A1* 12/2006 Seki et al. ................. 180/219
2007/0017721 A1*  1/2007 Dufresne et al. ......... 180/68.6
2007/0024089 A1*  2/2007 Takeshita ................... 296/192
2007/0096893 A1*  5/2007 Kondo ....................... 340/471

FOREIGN PATENT DOCUMENTS

EP      1 449 752 A2   8/2004
JP         64-393 Y2   1/1989

* cited by examiner

COWLING STRUCTURE OF MOTORCYCLE

BACKGROUND OF THE INVENTION

The present invention relates to an improvement of the cowling structure of a motorcycle.

As the conventional cowling structure of a motorcycle, there has been known the cowling structure which includes a fairing and an under cowl (for example, see JP-UM-B-64-393(JP '493)).

A motorcycle 60 shown in FIG. 6 of JP '493 is a vehicle in which a front portion of a handle 64 is covered with a fairing 2 and a lower portion of an engine 65 is covered with an under cowl 70, which is arranged below the fairing 2.

For example, when a radiator is arranged behind a front wheel 63, the radiator is positioned at an opening portion defined between the fairing 2 and the under cowl 70 and hence, the introduction of wind into the radiator does not occur using the fairing 2 and the under cowl 70 whereby the cooling performance of the radiator cannot be enhanced.

Accordingly, it may be possible to provide, for example, the structure in which the fairing 2 or the under cowl 70 is extended and the fairing 2 and the under cowl 70 are contiguously formed so as to cover the radiator from the side. In this case, the motorcycle 60 is liable to easily receive the air resistance when the motorcycle 60 is inclined in the lateral direction of the vehicle body and hence, there arises a tendency that a force necessary for inclining the vehicle body at the time of cornering is increased.

SUMMARY OF THE INVENTION

It is an object of the present invention to increase an ability of the introducing wind (or air) into a radiator, to reduce a force necessary for inclining a vehicle body at the time of cornering and, further, to enhance the marketability of a motorcycle by improving the cowl structure of the motorcycle.

In a motorcycle which arranges a radiator behind a front wheel and includes a cowling which covers a periphery of the radiator from a front side of a handlebar, a side opening which extends in the longitudinal direction of a vehicle is formed in the cowling such that the opening traverses an upper portion of the radiator in a side view, thus allowing air to pass through the motorcycle in the lateral direction of the vehicle body through the opening.

Since the opening traverses the upper portion of the radiator, it is possible to guide traveling air to the radiator by portions excluding the opening formed in the cowling.

Further, due to the formation of the opening, air is released in the lateral direction of the vehicle body and hence, the air resistance, when a rider inclines the vehicle body in the lateral direction, can be reduced.

Further, the side opening has a front portion (or forward opening) thereof opened frontwardly.

Due to the formation of the opening which has the front portion thereof opened frontwardly, air resistance is further reduced. Further, it is also possible to obtain a novel appearance. Additionally, the side opening has a vertical width of the front portion (forward opening) thereof set to be smaller than a vertical width of a rear portion thereof, behind the forward opening.

Since the vertical width of the front portion (forward opening) of the side opening is set smaller than the vertical width of the rear portion of the opening, behind the forward opening an area of the cowling in front of the radiator is increased and hence, it is possible to allow wind to be easily inducted into the radiator.

Thus, since the side opening which extends in the longitudinal direction of the vehicle is formed in the cowling in a state that the opening traverses the upper portion of the radiator in a side view, it is possible to introduce a large amount of air to the radiator using the cowling, thus enhancing an ability to cool the cooling water in the radiator. At the same time, it is possible to efficiently release air coming from the lateral direction of the vehicle body using the side openings. Accordingly, a force necessary for inclining the vehicle body can be reduced, whereby it is possible to enhance the driving performance at the time of cornering.

Further, since the side opening has the front portion (forward opening) thereof opened frontwardly, it is possible to efficiently release air coming from the lateral direction of the vehicle body of the cowling. Further, the motorcycle can acquire a novel appearance, thus enhancing the marketability thereof.

Additionally, since the side opening has the vertical width of the front portion (forward opening) thereof set to be smaller than a vertical width of a rear portion thereof, it is possible to increase the area of the portions excluding the opening of a front portion of the cowling and hence, air can be effectively introduced into the radiator whereby the cooling performance of the radiator can be further enhanced.

DETAILED DESCRIPTION OF THE INVENTION

The present invention is explained in conjunction with attached drawings. Here, the drawings are viewed in the same direction as the numerals.

Figure 1:
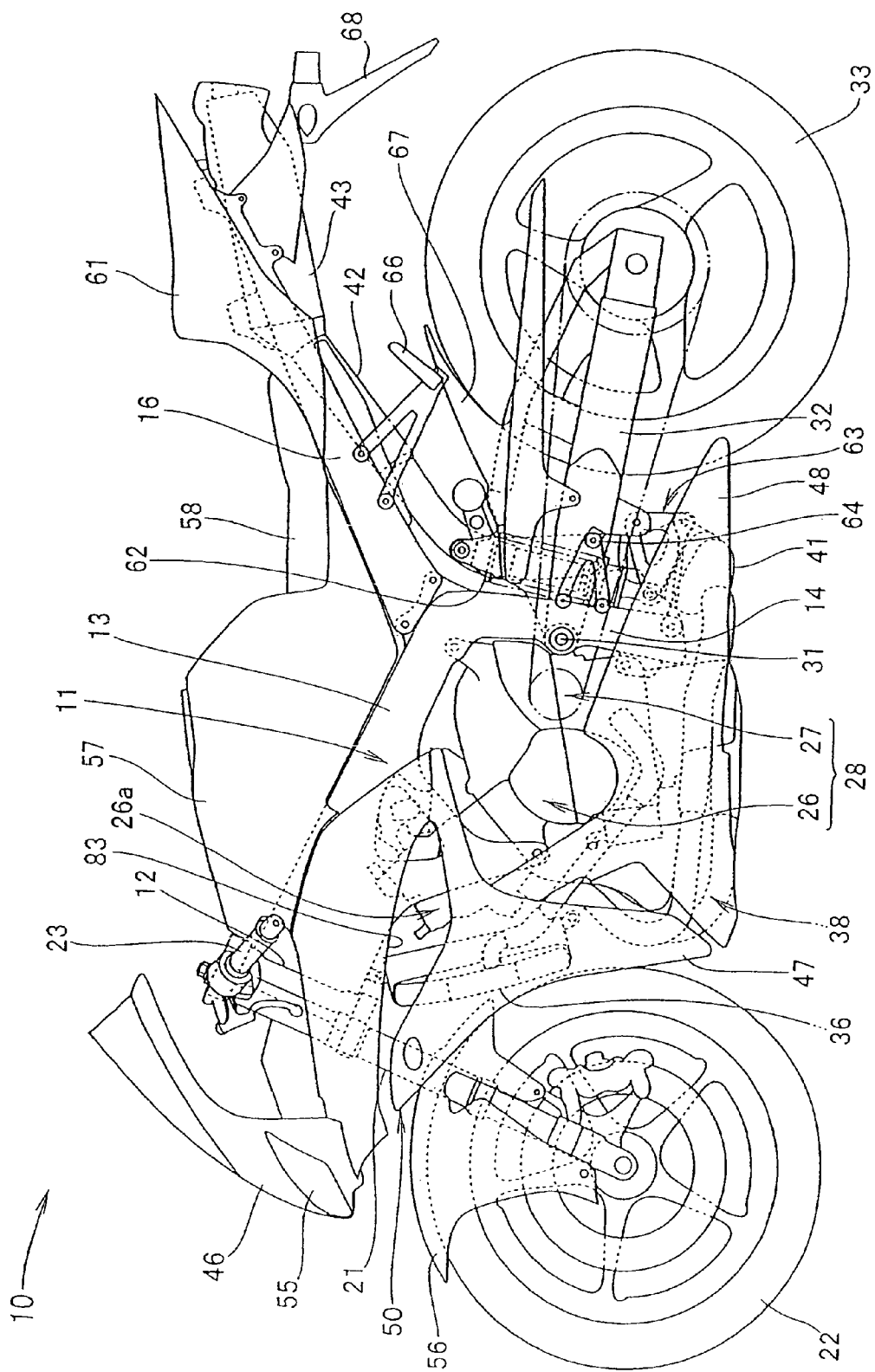
FIG. 1 illustrates a side view of a motorcycle which adopts the cowling structure according to the present invention.

FIG. 1 is a side view of a motorcycle which adopts the cowling structure according to the present invention. A motorcycle 10 is a vehicle which has the following structure. A vehicle body frame 11 is constituted of a head pipe 12, a pair of left and right main frames 13, 13 (only reference numeral 13 on the reader's side is shown in the drawing) which extend obliquely in the rearward and downward direction from the head pipe 12, a pair of left and right pivot plates 14, 14 which integrally extend downwardly from rear ends of the main frames 13, 13, a pair of left and right seat rails 16, 16 (only reference numeral 16 on the reader's side is shown in the drawing) which are connected to rear and upper portions of the main frames 13, 13 in a state that the seat rails 16, 16 extend rearwardly and obliquely upwardly. Further, a front fork 21 is steerablly mounted on the head pipe 12, a front wheel 22 is mounted on a lower end of the front fork 21, a handlebar 23 is mounted on an upper portion of the front fork 21, a power unit 28, which is constituted of an engine 26 and a transmission 27, is mounted on the main frames 13, 13 and the pivot plates 14, 14, a swing arm 32 is mounted on the pivot plates 14, 14 by way of a pivot shaft 31 in a vertically swingable manner, and a rear wheel 33 is mounted on a rear end of the swing arm 32.

The engine 26 is a water-cooled type engine to which a radiator 36 is connected. The radiator 36 is arranged in front of a cylinder portion 26a of the engine 26 and behind an upper portion of the front wheel 22. Here, reference numeral 38 indicates a plurality of front exhaust pipes which extend downwardly and rearwardly from the cylinder portion 26a, reference numeral 41 indicates a sub muffler which is connected to a rear end of the front exhaust pipe 38, reference numeral 42 is a rear exhaust pipe which extends from the sub muffler 41 in the upward direction and, thereafter, obliquely in the upward and rearward direction, and reference numeral 43 indicates a main muffler which is connected to a rear end of the rear exhaust pipe 42.

A cowling 50 includes an upper cowl 46 which covers a front side of the above-mentioned handlebar 23, a middle portion of the front fork 21, a front portion of the main frame 13, a front lower portion of the front exhaust pipe 38, a pair of left and right middle cowls 47, 47 (only reference numeral 47 on the reader's side is shown in the drawing) which cover respective sides of portions of the radiator 36 except for an upper portion, and a pair of left and right lower cowls 48, 48 (only reference numeral 48 on the reader's side is shown in the drawing) which cover a lower portion of the power unit 28, and a lower portion of the front exhaust pipe 38.

FIG. 1 illustrates a head lamp 55, a front fender 56, a fuel tank cover 57, a rider seat 58, a pillion seat 61, a rear cushion unit 62 which has one end thereof connected to an upper portion of the swing arm 32 and has the other end thereof connected to the pivot plates 14, 14 and a lower portion of the swing arm 32 by way of a link mechanism 63, pillion steps 66, 66, and rear fenders 67, 68.

Figure 2:
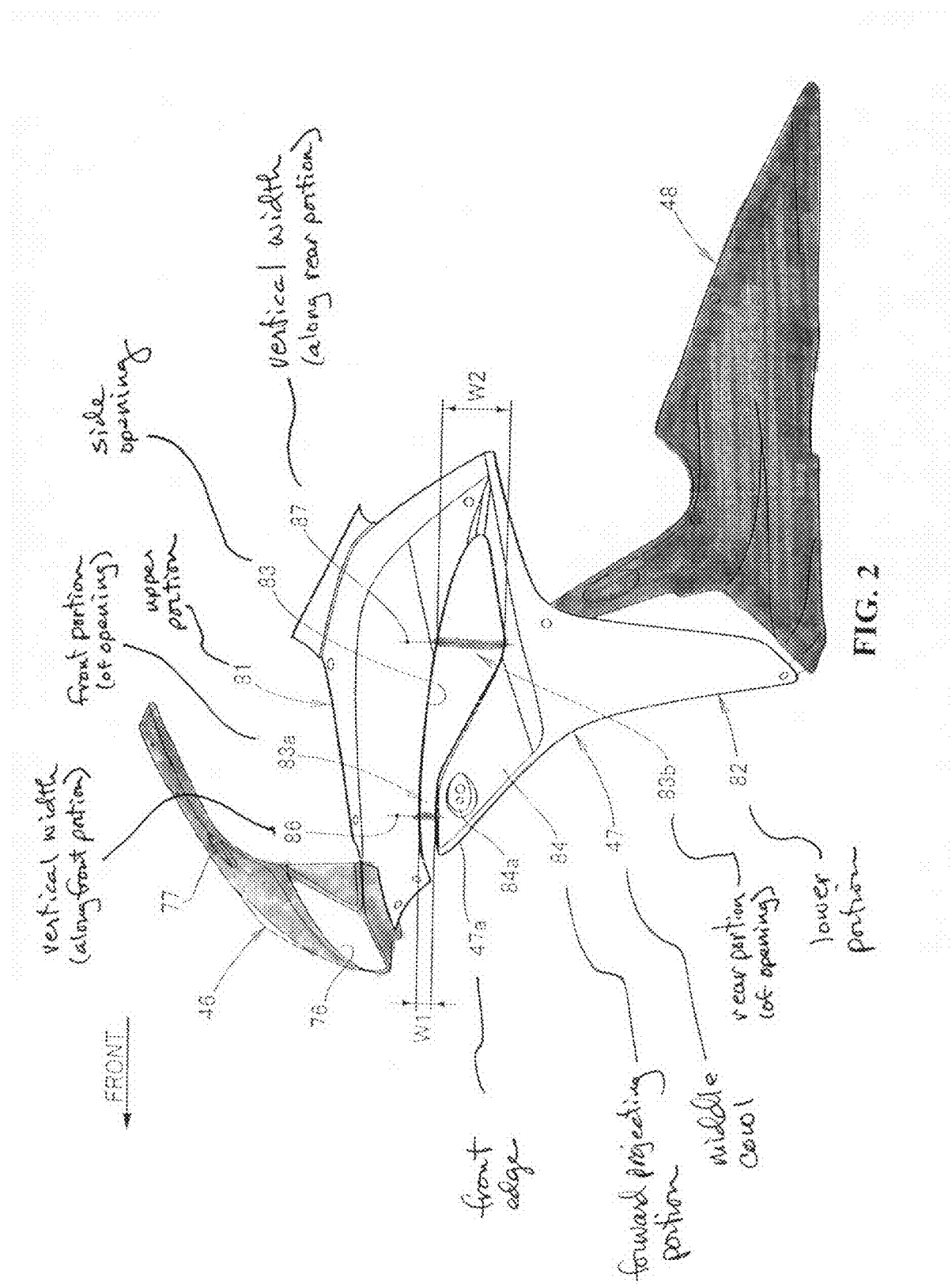
FIG. 2 is a side view of the cowling according to the present invention.

FIG. 2 is a side view (an arrow FRONT in the drawing indicating a front portion of the vehicle, the same definition applicable hereinafter) of the cowling according to the present invention. The upper cowl 46 includes a pair of left and right openings 76, 76 (only the left side shown) for mounting head lamps and a pair of left and right mirror mounting portions 77, 77 (only the left side shown) for mounting rear-view mirrors.

The middle cowl 47 (a portion having a profile thereof indicated by a bold line) includes a substantially parallelogram-shaped upper portion 81 and an inversely-triangular-shaped lower portion 82 which extends downwardly from the upper portion 81 integrally. Here, an opening (side opening) 83, which extends in the longitudinal direction of the vehicle, is formed in the upper portion 81, and a blinker mounting portion 84a which supports a blinker mounted thereon is formed on a frontward projecting portion 84 formed below a front portion 83a of the opening (or forward opening) 83.

The opening 83, which has the front portion 83a thereof opened toward a front edge 47a of the middle cowl 47, has a vertical width (for example, a vertical width along a vertical line 86 shown in the drawing) W1 of the front portion 83a thereof set to a small value, and a vertical width (for example, a vertical width along a vertical line 87 shown in the drawing) W2 of a rear portion 83b thereof set larger than W1.

In this manner, by setting the vertical width W1 of the front portion 83a of the opening 83 smaller than the vertical width W2 of the rear portion 83b of the opening 83, an area of the frontward projecting portion 84 can be further increased and hence, it is possible to increase an amount of wind (or air) which is introduced into the radiator 36 (see FIG. 1) using the frontward projecting portion 84.

Further, an opening area of the rear portion 83b can be increased along with the increase of the vertical width W2 of the rear portion 83b of the opening 83 and hence, it is possible to further reduce the air resistance on the middle cowl 47 attributed to wind which flows in the vehicle width direction of the motorcycle.

In this manner, the front portion 83a of the opening 83 is opened toward the front edge 47a of the middle cowl 47, as described above, for increasing the area of the opening 83 as a whole, for ensuring the amount of air introduced into the radiator 36 and, for presenting a novel appearance of the motorcycle.

Figure 3:
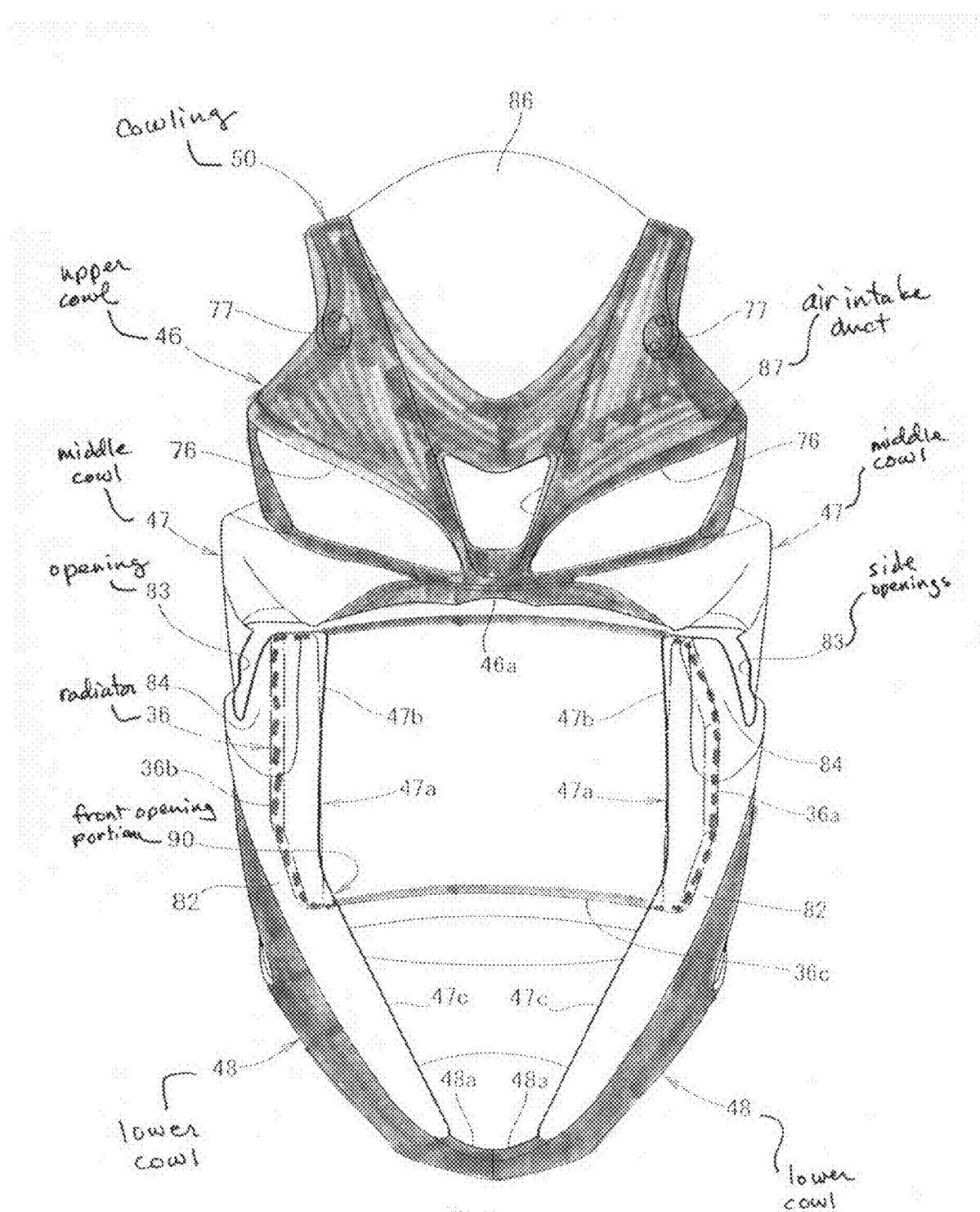
FIG. 3 is a front view of the cowling according to the present invention.

FIG. 3 is a front view of the cowling according to the present invention and shows cowling 50 in which a pair of left and right middle cowls 47, 47 is mounted on lower portions of upper cowls 46 which has a left-and-right symmetry, a pair of left and right lower cowls 48, 48 is mounted on the rear portions of the middle cowls 47, 47 and, at the same time, the left and right lower cowls 48, 48 have lower portions thereof connected to each other. Here, reference numeral 86 indicates a wind shield which is mounted on the upper cowl 46, and reference numeral 87 indicates an air intake duct opening which is formed in a lower center portion of the upper cowl 46.

A lower edge 46a of the upper cowl 46, front edges 47a, 47a (front edge 47a constituted of a front edge upper portion 47b and a front edge lower portion 47c) of the respective middle cowls 47, and front upper edges 48a, 48a of the respective lower cowls 48, 48, as viewed in a front view, constitute a front opening portion 90 of the cowling 50, wherein the front opening portion 90 is contiguous with the left and right openings 83, 83. In the drawing, profiles of the front opening portion 90 and the left and right openings 83, 83 are indicated by a bold line for facilitating the understanding of these openings.

The radiator 36 includes a left tank 36a, a right tank 36b, and a core 36c which constitutes a heat exchanging portion and connects the left tank 36a and right tank 36b with each other, wherein the core 36c is substantially overlapped to an upper portion of the front opening portion 90. Here, wind (or air) is introduced into the radiator 36 by the frontward projecting portions 84, 84 having substantially vertical front edge upper portions 47b, 47b which constitute upper portions of the front edges 47a, 47a and the lower portions 82, 82.

Next, the manner of operation of the cowling 50 described above is explained.

Figure 4:
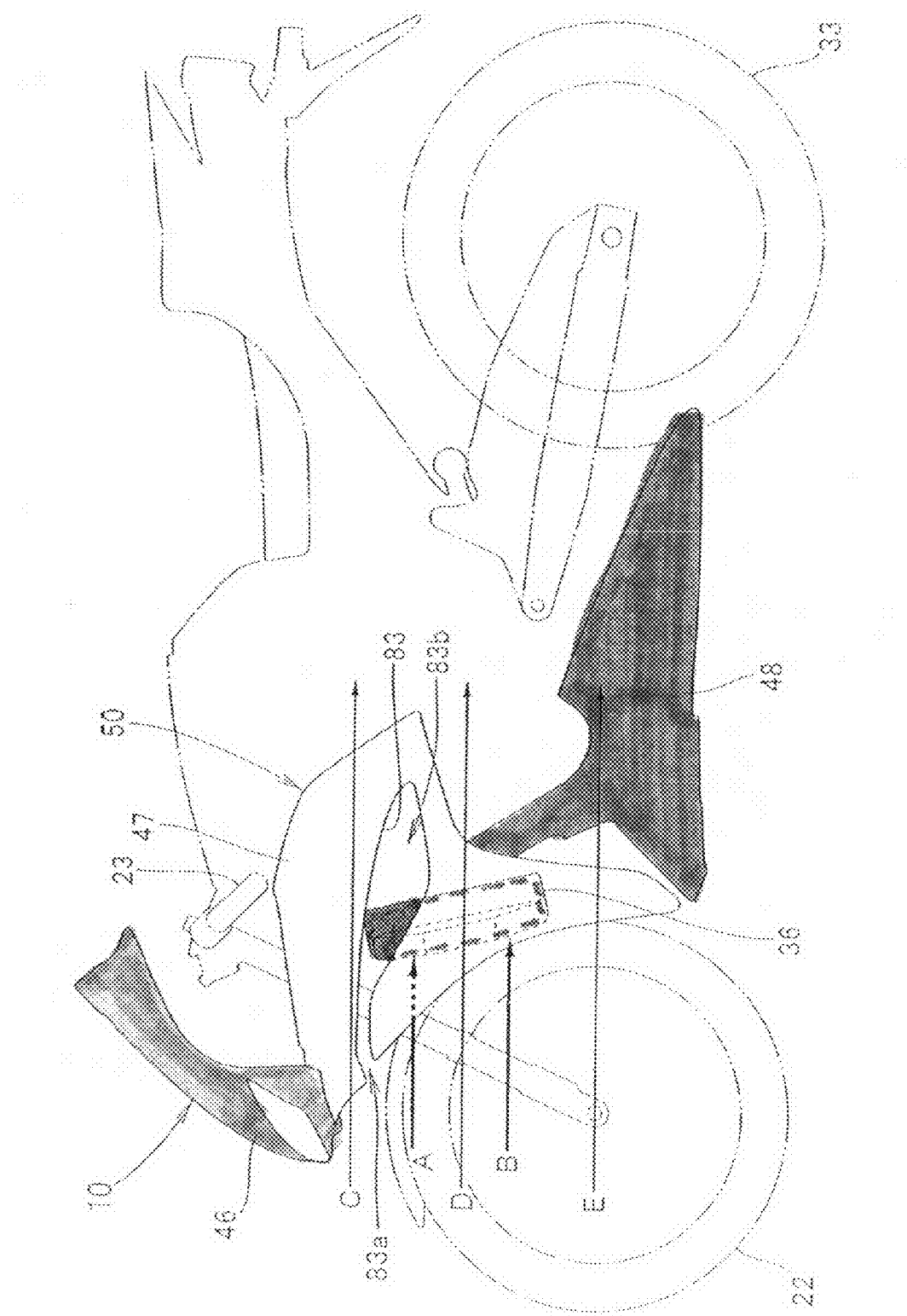
FIG. 4 is a first operational view which shows the manner of operation of the cowling according to the present invention.

FIG. 4 is a first operational view showing the manner of operation of the cowling according to the present invention.

During traveling of the motorcycle 10, due to the provision of the cowling 50, a traveling wind from the front side of the vehicle is introduced into the inside of the cowling 50 (indicated by bold arrows A, B) and, at the same time, a traveling wind which flows along a surface of the vehicle body is straightened (indicated by elongated arrows C, D, E).

The wind is introduced into the radiator 36 located in the inside of the cowling 50 particularly due to the presence of the middle cowl 47 as indicated by the arrows A and B. By decreasing the vertical width of the front portion 83a of the opening 83, the front-side area of the middle cowl 47 is increased and hence, it is possible to ensure an amount of wind to be introduced into the radiator 36.

Further, by straightening the traveling wind using the cowling 50, the straight traveling characteristic of the motorcycle 10 can be enhanced and, at the same time, the air resistance can be reduced.

Figure 5A:
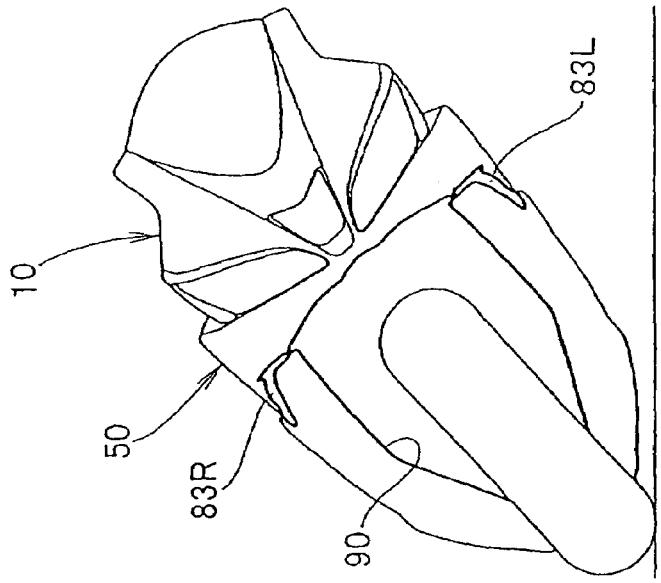
FIG. 5 is a second operational view which shows the manner of operation of the cowling according to the present invention.
Figure 5B:
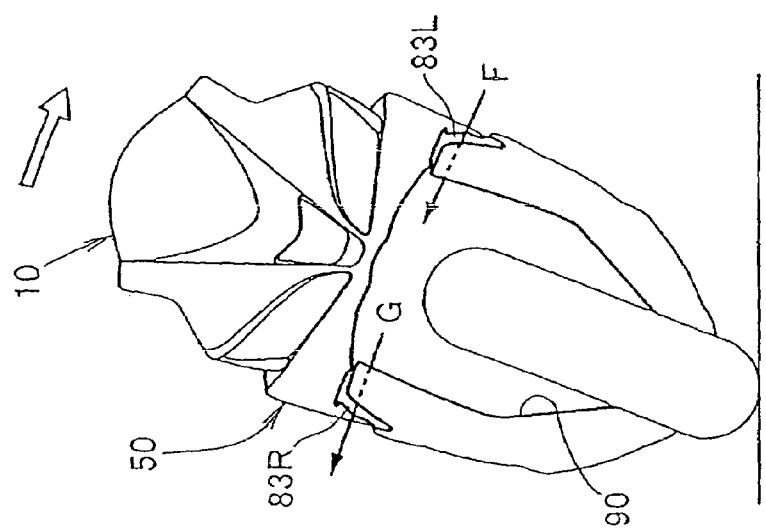
Figure 5C:
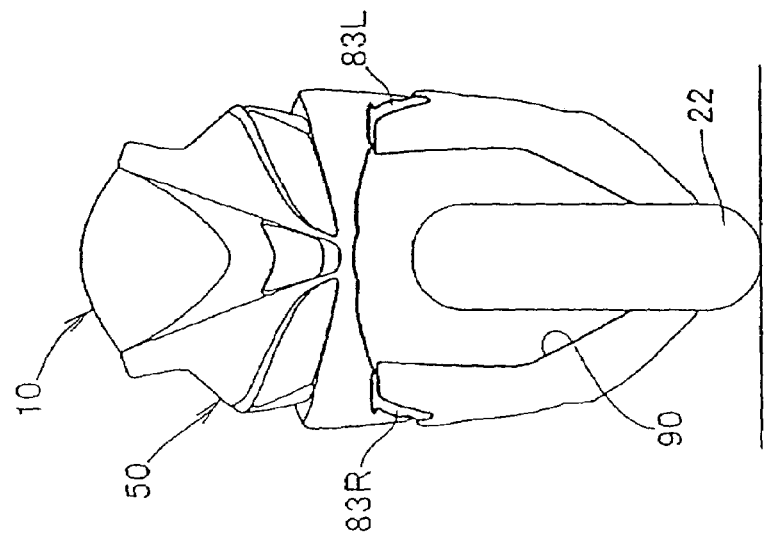

FIG. 5(a) to FIG. 5(c) are operational views showing the manner of operation of the cowling according to the present invention.

FIG. 5(a) shows a state in which the motorcycle 10 travels with an upright posture (that is, a state in which the motorcycle 10 travels in a straight direction). Here, profiles of the front opening portion 90 and the left and right openings 83L, 83R (here, the openings 83, 83 being distinguished from each other as the openings 83L, 83R, the distinction applicable hereinafter in the same manner) of the cowling 50 are indicated by bold lines (indicated in the same manner hereinafter). When the motorcycle 10 begins cornering from the above-mentioned state, and inclines to one side as shown in FIG. 5(c) by way of a state shown in FIG. 5(b), the traveling wind which flows along the cowling 50 or the traveling wind which hits the cowling 50 from the side of the vehicle as indicated by arrows C to E in FIG. 4 flows, as shown in FIG. 5(b), into the inside of the cowling 50 as indicated by the arrow F from the opening 83L on the cornering side, while the traveling wind flows to the outside from the inside of the cowling 50 through another opening 83R as indicated by the arrow G. Accordingly, the resistance attributed to the traveling wind at the time of inclining the motorcycle 10 can be decreased and hence, the rider can incline the motorcycle 10 with a smaller force.

For example, when the opening 83 is not formed, the straight traveling characteristic of the vehicle may be further enhanced by the cowling. In this case, the traveling wind is hardly released from the cowling 50 in the lateral direction of the vehicle body as described previously and hence, when the rider inclines the vehicle body, the air resistance is further increased, and this tendency is increased along with the increase of the vehicle speed.

To the contrary, with respect to the cowling 50 according to the present invention, while ensuring the straight traveling characteristic of the motorcycle 10, the inclining of the vehicle body during cornering can be performed with a smaller force due to the presence of the openings 83L, 83R and hence, even when the vehicle speed is increased, it is possible to suppress the increase of the air resistance at the time of inclining the vehicle body. Accordingly, it is possible to perform the inclining of the vehicle body more quickly. Further, when the vehicle travels on a zigzag road (that is, a winding road) for a long time, the rider can enjoy a more comfortable traveling.

As has been explained heretofore in conjunction with FIGS. 1-3, motorcycle 10 includes the radiator 36 located behind the front wheel 22 and the cowling 50 covering the periphery of the radiator 36 from the front side of the handlebar 23. Further, opening 83 which extends in the longitudinal direction of the vehicle and is formed in the cowling 50 such that the opening 83 traverses the upper portion of the radiator 36 in the side view, thus allowing wind to pass through the motorcycle 10 in the lateral direction of the vehicle body due to the presence of the opening 83.

The opening 83 which extends in the longitudinal direction of the vehicle is formed in the cowling 50 such that the opening 83 traverses the upper portion of the radiator 36 in the side view and hence, a large amount of wind can be introduced into the radiator 36 using the cowling 50, thus enhancing the ability to cool the cooling water by the radiator 36. Further, a wind coming from the lateral direction of the vehicle body can be efficiently released using the opening 83. Accordingly, a force necessary for inclining the vehicle body can be decreased, thus enhancing the driving performance of the vehicle at the time of cornering.

Furthermore, opening 83 has front portion 83a thereof opened frontwardly.

By having the front portion 83a of the opening 83 opened frontwardly, it is possible to efficiently release the wind coming from the lateral direction of the vehicle body of the cowling 50. Further, it is possible to allow the motorcycle 10 to acquire a novel appearance, thus enhancing the marketability of the motorcycle 10.

Additionally, as noted above, the vertical width W1 of the front portion 83a of opening 83 is set to be smaller than the vertical width W2 of rear portion 83b of opening 83.

By setting the vertical width W1 of the front portion 83a to be smaller than the vertical width W2 of the rear portion 83b, the area of the portion of the front portion of the cowling 50, except for the opening 83, can be increased and hence, wind can be effectively introduced into radiator 36, thus further enhancing the cooling performance of radiator 36.

As shown in FIG. 2, the opening 83 is formed in the middle cowl 47 and the opening 83 has the front portion 83a thereof opened at the front edge 47a side. However, the present invention is not limited to such a structure and there may be a case that, in such a state, a back plate may be mounted on a back side of the middle cowl 47, and an upper edge and a lower edge of the front portion 83a of the opening 83 may be connected with each other using this back plate while ensuring the area of the opening 83. Due to such a constitution, it is possible to enhance the rigidity of the middle cowl 47 while acquiring a novel appearance of the motorcycle.

We claim:

1. A cowling for a motorcycle in which a radiator is disposed behind a front wheel thereof, said cowling comprising:
    a middle cowl member presenting a front opening, in front of the radiator, such that said cowl member covers at least a portion of the radiator, from the front thereof, and
    wherein said cowl member also includes left and right side openings formed therein, and extending in the longitudinal direction on both sides thereof, said left and right side openings being open to an upper portion of the radiator, from a side view thereof, such that said left and right side openings communicate with one another in a width wise direction of the motorcycle, for allowing air to pass therethrough.

2. The cowl of claim 1, wherein either one of said left and right side openings has a front portion and a rear portion thereof.

3. The cowl of claim 2, wherein the other of said left and right side openings has a front portion and a rear portion thereof.

4. The cowl of claim 2, wherein said front portion has a vertical width smaller than a vertical width of said rear portion.

5. The cowl of claim 3, wherein both of said front portions, each has a vertical width smaller than a vertical width of an associated one of said rear portions.

* * * * *